(12) United States Patent
Echevarria

(10) Patent No.: US 12,738,146 B2
(45) Date of Patent: Sep. 15, 2026

(54) CANDLE ALERT MONITORING APPARATUS AND METHOD

(71) Applicant: Suzanne Echevarria, Cypress, TX (US)

(72) Inventor: Suzanne Echevarria, Cypress, TX (US)

( * ) Notice: Subject to any disclaimer, the term of this patent is extended or adjusted under 35 U.S.C. 154(b) by 12 days.

(21) Appl. No.: 19/034,151

(22) Filed: Jan. 22, 2025

(65) Prior Publication Data

US 2025/0246061 A1 Jul. 31, 2025

Related U.S. Application Data

(60) Provisional application No. 63/740,162, filed on Dec. 30, 2024, provisional application No. 63/625,274, filed on Jan. 25, 2024.

(51) Int. Cl.

| | |
|---|---|
| ***G08B 21/24*** | (2006.01) |
| ***F23Q 2/32*** | (2006.01) |
| ***F23Q 3/01*** | (2006.01) |
| *H04W 4/02* | (2018.01) |
| *H04W 4/80* | (2018.01) |

(52) U.S. Cl.

CPC ............... *G08B 21/24* (2013.01); *F23Q 2/32* (2013.01); *F23Q 3/01* (2013.01); *H04W 4/025* (2013.01); *H04W 4/80* (2018.02)

(58) Field of Classification Search

CPC . G08B 21/24; F23Q 2/32; F23Q 3/01; H04W 4/025; H04W 4/80

See application file for complete search history.

(56) References Cited

U.S. PATENT DOCUMENTS 9,295,285 B2 * 3/2016 Glazer .................. G16H 20/70
11,828,464 B1 * 11/2023 Anand ...................... F23Q 2/36
2007/0167185 A1 * 7/2007 Bjerrum-Niese ... B60R 11/0247 455/550.1
2009/0075691 A1 * 3/2009 Yang ......................... F23Q 2/32 455/556.1
2015/0024355 A1 * 1/2015 Ghofrani ................ F23Q 2/325 434/236
2015/0208723 A1 * 7/2015 Glazer ...................... F23Q 7/14 434/238

* cited by examiner

*Primary Examiner* — Curtis J King

(74) *Attorney, Agent, or Firm* — Darryl Edwin Scott

(57) ABSTRACT

A reusable igniter having an igniter processor, a memory storage device coupled to the igniter processor, and a first short-range wireless device coupled to the igniter processor. A mobile device may be communicably coupled to the reusable igniter. The mobile device has a second short-range wireless device couplable to the first short-range wireless device and a downloadable software application having a notification system.

19 Claims, 6 Drawing Sheets

CANDLE ALERT MONITORING APPARATUS AND METHOD

CROSS-REFERENCE TO RELATED APPLICATIONS

This application claims the benefit of prior-filed provisional application No. 63/625,274 filed on Jan. 25, 2024. This application also claims the benefit of prior-filed provisional application No. 63/740,162 filed on Dec. 30, 2024.

BACKGROUND

Candle enthusiast enjoys the smell of lit candles in their home. Many enthusiasts often visit popular retail stores and smaller shops to acquire the latest candle introduced into the market. The United States' retail sale of candles can reach a total of $3.1 billion annually. However, annually, an estimated 23,600 house fires caused by candles has resulted in an exorbitant number of civilian injuries, fatalities, and millions in direct property loss. Women are more likely to be injured or killed in residential candle fires. Having an alert system that informs an enthusiast their candles are ignited and unmonitored is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Scented candles are a popular addition to homes, offering a cozy ambiance, soothing aromas, and a sense of calm. They can enhance relaxation during moments of self-care, such as baths or quiet reading sessions, and are often used to mask unpleasant odors or create a welcoming environment for guests. Available in various fragrances, from floral and fruity to woodsy and spicy, scented candles cater to a wide range of personal preferences. However, while their benefits may seem harmless, scented candles can pose significant risks if left unattended.

One of the primary dangers associated with scented candles is their potential to cause fires. An unsupervised candle can quickly become hazardous, especially if placed near flammable materials such as curtains, paper, or furniture. A small flame can escalate into a blaze if knocked over by a pet, a draft, or an accidental nudge. According to fire safety statistics, unattended candles are a leading cause of house fires, making vigilance crucial when using them. It is essential to extinguish candles before leaving the room, going to bed, or becoming distracted.

In addition to fire risks, scented candles can also produce soot and harmful chemicals when burned for long periods, particularly if they contain synthetic fragrances or are made from paraffin wax. These emissions can compromise indoor air quality, potentially exacerbating respiratory issues in sensitive individuals. While they can create a comforting atmosphere, responsible use and awareness of potential hazards are necessary to enjoy scented candles safely.

The embodiments described herein are of an apparatus and method to mitigate fires caused by unmonitored candles. The disclosure will provide details about how a user will be notified as to when to extinguish candles, especially if the tool detects when the user leaves their home. This tool will also remind the user of the location of the candle (e.g., bedroom, bathroom, upstairs hallway) and to send a notification to extinguish the candle if user's proximity to the candle is undetectable.

Figure 1:
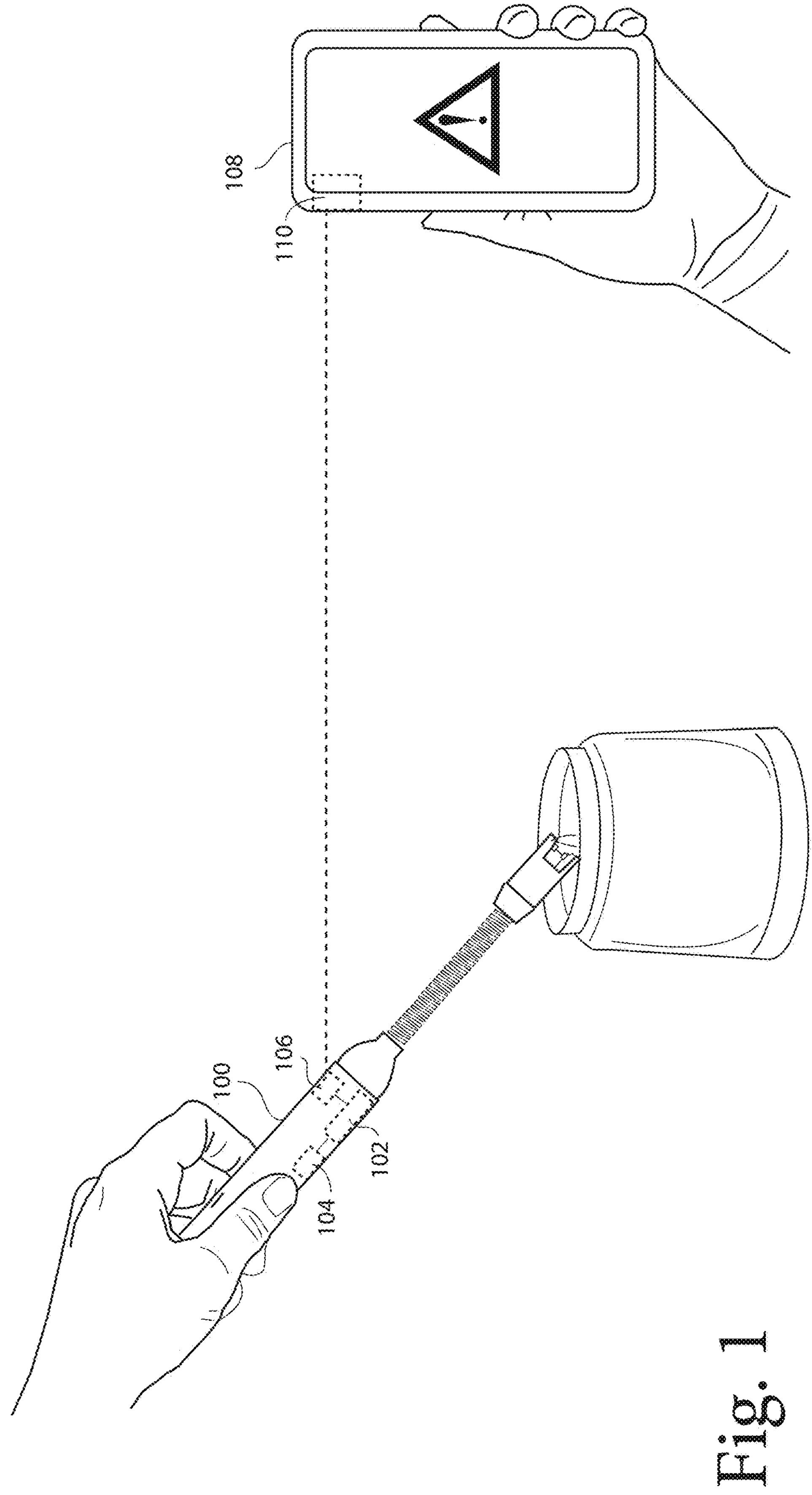
FIG. 1 is a perspective view of a candle being ignited by a reusable igniter communicably coupled to a mobile device.

For example, FIG. 1 is a perspective view of a candle being ignited by a reusable igniter communicably coupled to a mobile device. As illustrated in FIG. 1 the apparatus may include a reusable igniter 100. In one or more embodiments, the reusable igniter 100 may be an electric rechargeable igniter. Electric rechargeable igniters are portable devices that are reusable devices designed to produce a flame or a spark for igniting fires, stoves, candles, grills, fireworks, or other combustible materials. Unlike traditional disposable lighters, these electric rechargeable igniters are powered by a rechargeable internal battery, which has the benefit of being environmentally friendly and cost-effective over time. Conversely, the reusable ignitor 100 may be a butane filled igniter. A butane-filled igniter is a type of lighter or ignition device that uses butane gas as fuel to create a flame. Butane is a highly flammable hydrocarbon gas that burns cleanly and is commonly used in portable lighters, kitchen torches, and camping stoves. To reuse the butane-filled ignitor, a user would need a compatible butane refill canister to refill the igniter.

Integrated within the reusable igniter 100 is an igniter processor 102. Note, the igniter processor 102 is illustrated as dashed lines for clarity. The igniter processor 102 is the device that operates as the central processing unit. The igniter processor 102 runs task and programs and calculates when a user needs to be notified as to when an ignited candle needs to be extinguished. Coupled to igniter processor 102 and integrated within the reusable igniter 100 is a memory storage device 104. Note, the memory storage device 104 is illustrated as dashed lines for clarity. The memory storage device 104 is the device that stores data received from the igniter processor 102 and retrieved for later access. For example, a user may ignite the reusable igniter 100 while out of range of their mobile device. The memory storage device 104 archives the "ignition" along with the time, date, and other pertinent information for later transfer to the mobile device.

In one or more embodiments, the reusable igniter 100 includes a first short-range wireless device 106. The first short-range wireless device 106 is a communication device designed to transmit and receive data wirelessly over a limited distance, typically within a few centimeters to several meters. Short-range wireless devices use various wireless communication technologies such as Bluetooth® (owned by Bluetooth SIG, Inc.), near-field communication (NFC), infrared (IR), radio frequency identification (RFID), and wireless fidelity (WI-FI).

As further illustrated in FIG. 1, the reusable ignitor 100 is communicably coupled to a mobile device 108, such as a smart-phone or software-enabled smart watch that has the functionality of a traditional phone with advanced computing capabilities. Smart-phones and smart-watches allow users to make calls, send texts, and access the internet, and include features such as a touchscreen interface, an operating system, downloadable software such as "Apps", cameras, etc. Similar to most modern smart-phone devices, the mobile device 108 has a second short-range wireless device 110 integrated within the mobile device 108. Note, the second short-range wireless device 110 is illustrated as dashed lines for clarity. The second short-range wireless device 110 is communicably couplable to the first short-range wireless device 106. That is, when the reusable igniter 100 is activated (i.e., ignited, clicked, or moved) and within range of the second short-range wireless device 110, data from the reusable igniter 100 is transferred via the first short-range wireless device 106 to the second short-range wireless device 110 installed on the mobile device 108.

A downloadable software application installed on the mobile device 108 interprets the data received and, if applicable, a notification system programmed within or as a part of the downloadable software application alerts a user. The notification system may be a push notification (e.g., email, pop-up, text message, alarm), a timer, an audible notification, or a visible alert on the mobile device 108 caused by the user exceeding a geolocation restriction programmed on the mobile device 108. An example of a geolocation restriction is when the user (along with their mobile device 108) leaves the room, the house, or a specified distance away from the candle. The location of the candle is programmed by the user on the downloadable software application. Thus, when the user leaves the location of the candle, the user will receive a notification on their mobile device 108 that the candle is still ignited. In addition, once the user extinguish the candle, the user may update the downloadable software application on the mobile device 108 of the updated status of that particular candle.

Figure 2:
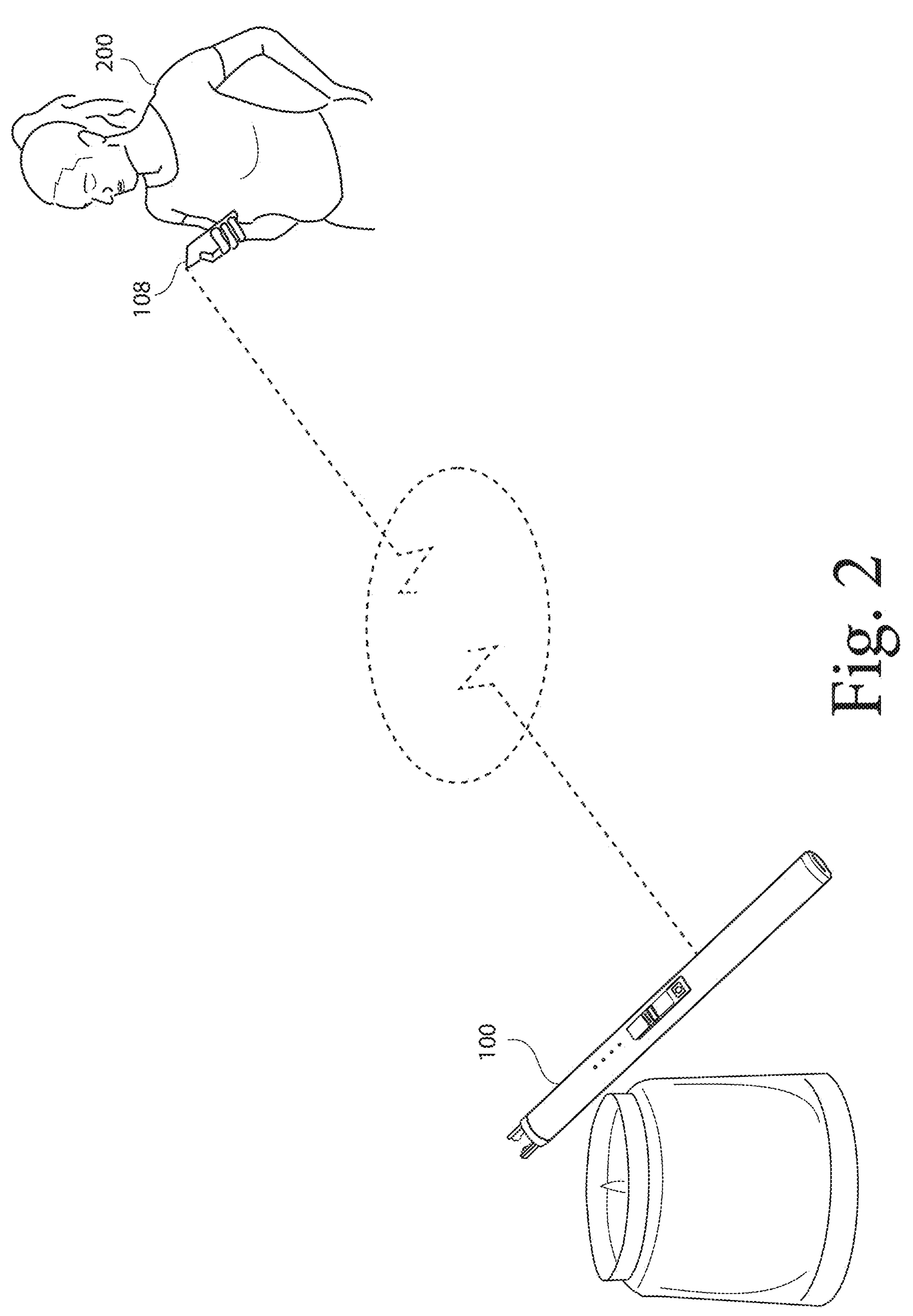
FIG. 2 is a perspective view of a user reviewing a notification on a mobile device once a geolocation restriction is breached between the mobile device and a reusable igniter.

This action is further illustrated in FIG. 2, which is a perspective view of a user reviewing a notification on a mobile device once a geolocation restriction is breached between the mobile device and a reusable igniter. For example, FIG. 2 illustrates a user 200 reviewing a notification on their mobile device 108. In most smart phones, including the mobile device 108 described herein, a geolocation tracking device (i.e., global positioning system) is installed in the mobile device 108. As described above, when the user 200 either exceeds (illustrated by the dashed circle and break in the connection) the short-range wireless connection or exceed a geographical restriction setting (e.g., leaving the room or house) programmed within the downloadable software application, the user 200 receives a notification via their mobile device 108. In addition, the user 200 may program the downloadable software application to use a timer to alert the user 200 to extinguish the candle.

Figure 4:
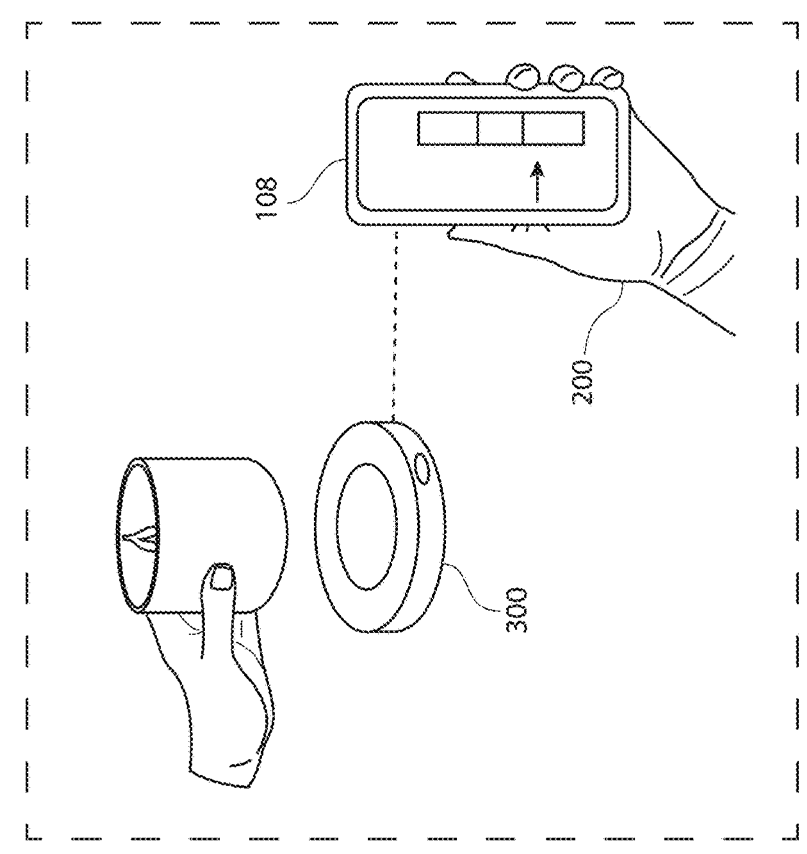
FIG. 4 is a perspective view of a candle being placed on a disc that is communicably coupled to a mobile device.
Figure 3:
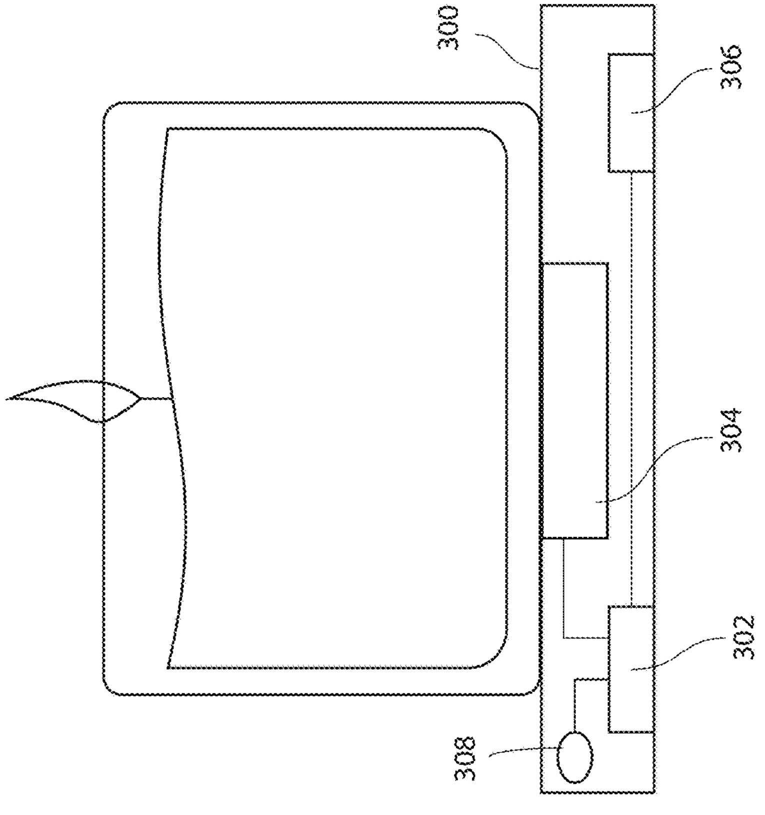
FIG. 3 is a profile schematic view of a candle and a disc having a disc processor, a pressure sensor, and a third short-range wireless device.
Figure 5:
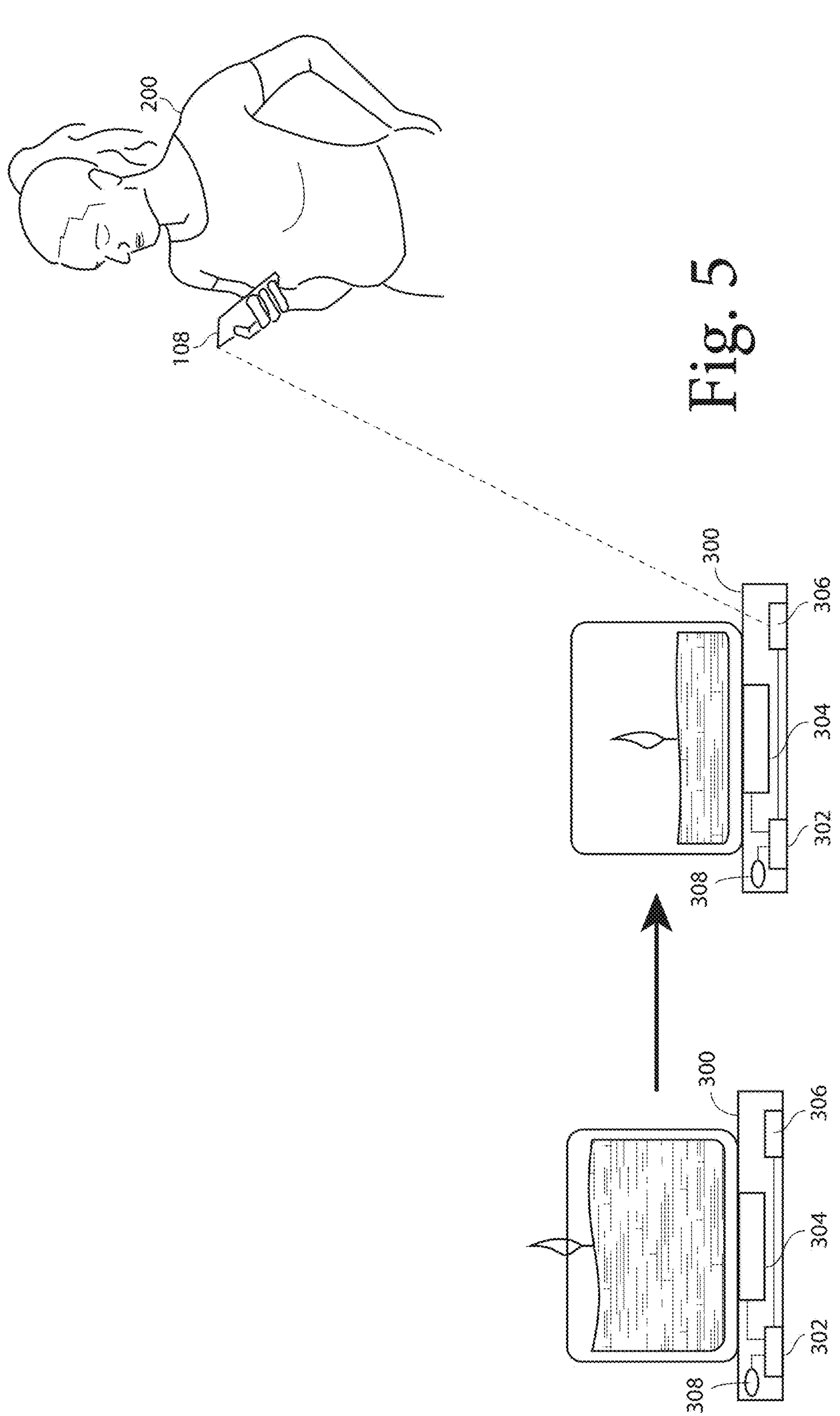
FIG. 5 is a profile schematic view of a candle that changes in mass, a disc having a disc processor, a pressure sensor, and a third short-range wireless device that is communicably coupled to a mobile device being held by a user.

Additional notification apparatuses and methods may be included in this system. For example, FIG. 3 is a profile schematic view of a candle and a disc having a disc processor, a pressure sensor, and a third short-range wireless device. FIG. 4 is a perspective view of a candle being placed on a disc that is communicably coupled to a mobile device. FIG. 5 is a profile schematic view of a candle that changes in mass, a disc having a disc processor, a pressure sensor, and a third short-range wireless device that is communicably coupled to a mobile device being held by a user.

As illustrated in FIGS. 3 and 4, the apparatus may include a disc 300. The disc 300 may form a circular shape, an oval shape, a rectangular shape, or any other similar shape. In one or more embodiments, the disc 300 has an internal volume such that electrical components may be positioned inside the disc 300. For example, as illustrated in FIG. 3, the disc 300 may include a disc processor 302. Similar to the igniter processor 102 described in connection the reusable igniter 100, the disc processor 302 is the device that operates as the central processing unit. The disc processor 302 runs task and programs and calculates when a user needs to be notified as to when a candle has significantly changed in weight or mass.

The change in the candle's weight or mass is measured by a pressure sensor 304 coupled to the disc processor 302 that is positioned within the volume of the disc 300. Specifically, a candle is placed on the disc 300 and ignited by the reusable igniter 100. As the candle burns, the weight or mass changes which is detected by the pressure sensor 304, measured by the disc processor 302, and transmitted to a third short-range wireless device 306 that is communicably couplable to the second short-range wireless device 110 installed on the mobile device 108.

Alternatively, a second alert system 308 may be coupled to the disc processor 302 as a means for alerting the user 200 of the significant change in the candle's weight or mass. That is, the second alert system 308 may be an alarm system integrally coupled to the disc 300 that sends a visual or audible signal to the user in response to a change in the candle's weight or mass or by a set timer programmed by the user 200 using the mobile device 108.

As illustrated in FIG. 5, once the disc 300 detects a change in the candle's mass or weight, the disc processor 302 transmits that data via the third short-range wireless device 306 to the second short-wave wireless device 110 installed in the mobile device 108. The downloadable software application may be configured to notify the user 200 of the change in the candle's weight or mass, when the short-range wireless connection is exceeded, or when the user 200 exceeds a predetermined geolocation restriction (e.g., leaving the house or room).

To determine the change in the weight or mass of the candle, the disc processor 302 takes a first measurement of the candle once the candle is initially placed on the disc 300 triggering the pressure sensor 304. Either a memory device (not illustrated) installed in the disc 300 or the mobile device 108 collects and stores the first pressure sensor reading of the candle. Once the mobile device 108 is in range of the disc 300, the first measurement stored on the memory device is then transferred to the mobile device 108. The user 200 has the option of configuring an alert notification setting based on the change of the weight or mass of the candle once ignited. Once the weight or mass of the disc 300 reaches or exceeds the alert notification setting configured by the user 200 using the mobile device 108, either the second alert system 308 or the mobile device 108 alerts the user 200.

As previously discussed, extinguishing a candle before leaving the house is a crucial safety measure that helps prevent house fires, which can lead to devastating loss of life, property damage, and emotional trauma. Candles, when left unattended, can easily ignite nearby flammable objects such as curtains, furniture, or paper if disturbed by drafts or accidental falls. By ensuring candles are fully extinguished, you eliminate the risk of an open flame spreading, providing peace of mind while you're away.

Figure 6:
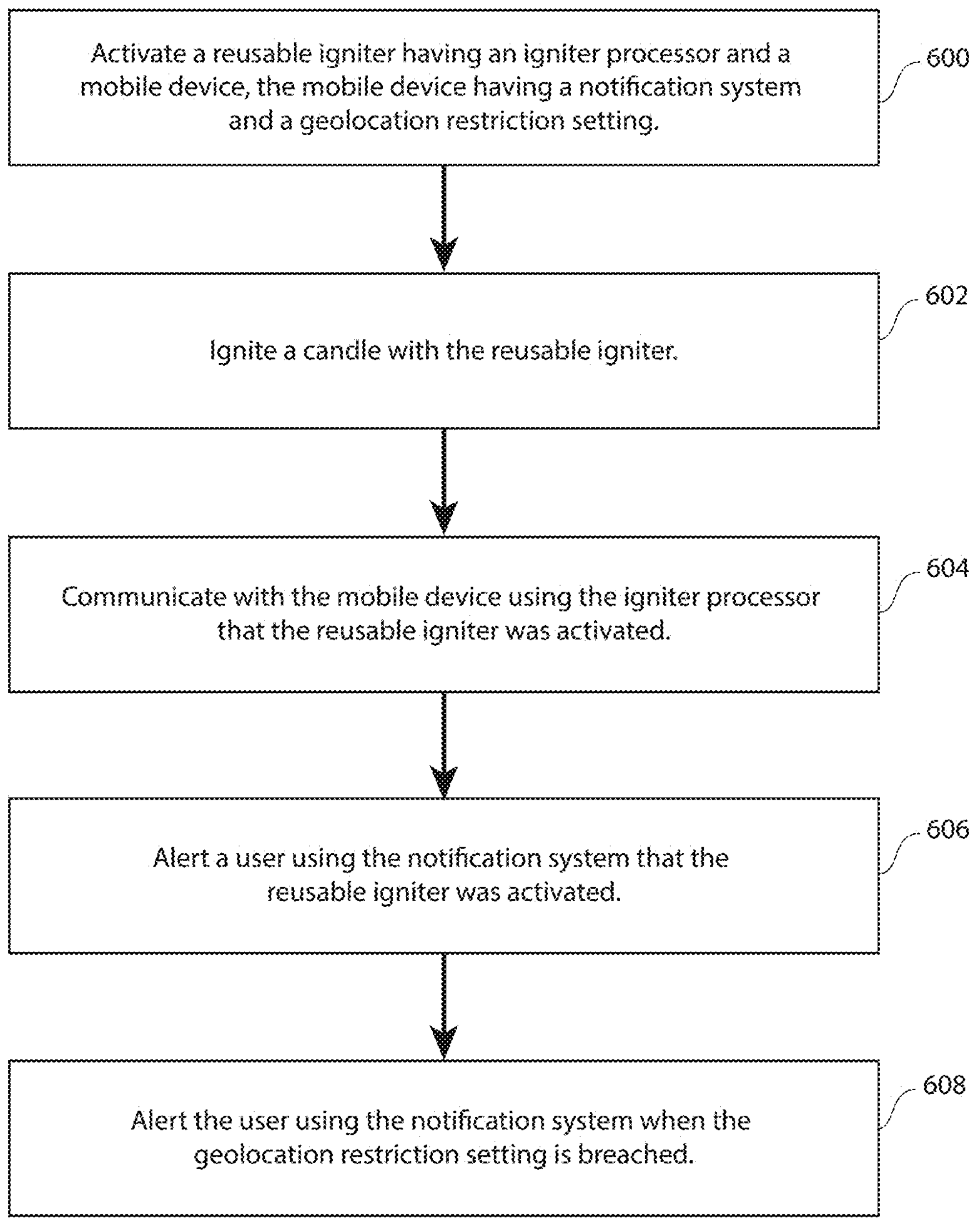
FIG. 6 is a flow chart of a method of activating a reusable ignitor such that it notifies a mobile device once the reusable ignitor is activated and once a geolocation restriction setting is breached.
Figure 7:
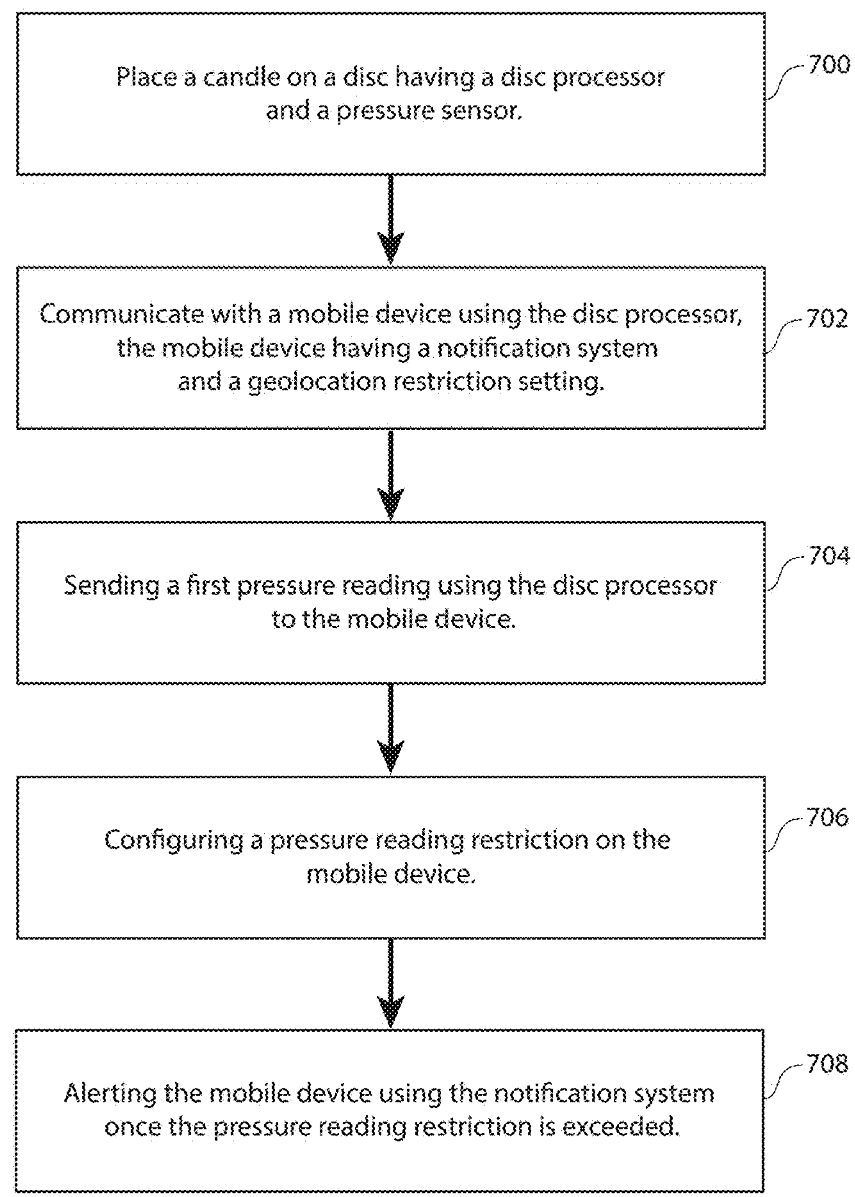
FIG. 7 is a flow chart of a method of placing a candle on a disc having a disc processor and a pressure sensor such that the disc notifies a mobile device when the candle changes in mass.

Executing this safety apparatus is illustrated in FIGS. 6 and 7. For example, FIG. 6 is a flow chart of a method of activating a reusable ignitor such that it notifies a mobile device once the reusable ignitor is activated and once a geolocation restriction setting is breached. FIG. 7 is a flow chart of a method of placing a candle on a disc having a disc processor and a pressure sensor such that the disc notifies a mobile device when the candle changes in mass. In operation, the method includes activating a reusable igniter (such as reusable igniter 100) having an igniter processor (such as ignitor processor 102) and a mobile device (such as mobile device 108). The mobile device (such as mobile device 108) has a notification system and a geolocation restriction setting (block 600). The candle is ignited using the reusable igniter (such as reusable igniter 100) (block 602). The igniter processor (such as igniter processor 102) communicates with the mobile device (such as mobile device 108) that the reusable igniter (such as reusable igniter 100) was ignited (block 604). The notification system alerts a user (such as user 200) that the reusable igniter (such as reusable igniter 100) was activated (block 606). The notification system alerts a user (such as user 200) when the geolocation restriction setting is breached (block 608).

In addition, a candle is placed on a disc (such as disc 300) having a disc processor (such as disc processor 302) and a pressure sensor (such as pressure sensor 304) (block 700). A disc processor (such as disc processor 302) communicates with a mobile device (such as mobile device 108), the mobile device (such as mobile device 108) having a notification system and a geolocation restriction setting (block 702). The disc processor (such as disc processor 302) sends a first pressure reading to the mobile device (such as mobile device 108) (block 704). The mobile device (such as mobile device 108) configures a pressure reading restriction (block 706). The notification system alerts the mobile device (such as mobile device 108) once the pressure reading restriction is exceeded (block 708).

In one aspect, an apparatus includes a reusable igniter having an igniter processor, a memory storage device coupled to the ignitor processor, and a first short-range wireless device coupled to the igniter processor. A mobile device is communicably coupled to the reusable igniter. The mobile device has a second short-range wireless device couplable to the first short-range wireless device. The mobile device has a downloadable software application. The downloadable software application has a notification system.

Implementation may include one or more of the following. The apparatus may include a disc having a disc processor, a pressure sensor coupled to the disc processor and a third short-range wireless device couplable to the second short-range wireless device. The reusable igniter may be an electric rechargeable igniter. The reusable igniter may be a butane filled igniter. The mobile device may be a software-enabled watch. The notification system may be a geolocation push notification system. A second alert system may be coupled to the disc processor.

In one aspect, the method includes activating a reusable ignitor having an igniter processor, a memory storage device coupled to the igniter processor, and a first short-range wireless device coupled to the igniter processor. A mobile device is communicably coupled to the reusable igniter. The mobile device has a second short-range wireless device coupled to the first short-range wireless device. A downloadable software application has a notification system and a geolocation restriction setting. A candle is ignited with the reusable igniter. The igniter processor communicates with the mobile device that the reusable igniter was activated. The notification system alerts a user that the reusable igniter was activated. The notification system alerts the user when the geolocation restriction setting is breached.

Implementation may include one or more of the following. The method may include a disc having a disc processor, a pressure sensor coupled to the disc processor and a third short-range wireless device couplable to the second short-range wireless device. The reusable igniter may be an electric rechargeable igniter. The reusable igniter may be a butane filled igniter. The mobile device may be a software-enabled watch. The notification system may be a geolocation push notification system. A second alert system may be coupled to the disc processor.

In one aspect, the method includes placing a candle on a disc having a disc processor, a pressure sensor coupled to the disc processor, and a third short-range wireless device coupled to the disc processor. The disc processor communicates with the mobile device. The mobile device has a second short-range wireless device coupled to the third short-range wireless device and a downloadable software application. The downloadable software application has a notification system and a geolocation restriction setting. The disc processor sends a first pressure sensor reading to the mobile device. A pressure reading restriction is configured on the mobile device. The notification system alerts the mobile device once the pressure reading restriction is exceeded.

Implementation may include one or more of the following. A reusable igniter may be couplable to the mobile device. The reusable igniter may have an igniter processor, a memory storage device coupled to the igniter processor, and a first short-range wireless device coupled to the igniter processor. The reusable igniter may be an electric rechargeable igniter. The mobile device may be a software-enabled watch. The notification system may be a geolocation push notification system.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
a reusable igniter having:
an igniter processor;
a memory storage device coupled to the igniter processor; and
a first short-range wireless device coupled to the igniter processor;
a mobile device communicably coupled to the reusable igniter, the mobile device having:
a second short-range wireless device couplable to the first short-range wireless device; and
a downloadable software application having a notification system; and
a disc having:
a disc processor;
a pressure sensor coupled to the disc processor; and
a third short-range wireless device couplable to the second short-range wireless device.

2. The apparatus of claim 1 wherein the reusable igniter is an electric rechargeable igniter.

3. The apparatus of claim 1 wherein the reusable igniter is a butane filled igniter.

4. The apparatus of claim 1 wherein the mobile device is a software-enabled watch.

5. The apparatus of claim 1 wherein the notification system is a geolocation push notification system.

6. The apparatus of claim 1 wherein a second alert system is coupled to the disc processor.

7. A method comprising:
activating a reusable igniter having:
an igniter processor;
a memory storage device coupled to the igniter processor; and
a first short-range wireless device coupled to the igniter processor;
a mobile device communicably coupled to the reusable igniter, the mobile device having:
a second short-range wireless device couplable to the first short-range wireless device; and
a downloadable software application having a notification system and a geolocation restriction setting;
igniting a candle with the reusable igniter;
the igniter processor communicating with the mobile device that the reusable igniter was activated;
the notification system alerting a user that the reusable igniter was activated; and
the notification system alerting the user when the geolocation restriction setting is breached.

8. The method of claim 7 further comprising:
a disc having:
a disc processor;
a pressure sensor coupled to the disc processor; and
a third short-range wireless device couplable to the second short-range wireless device.

9. The method of claim 7 wherein the reusable igniter is an electric rechargeable igniter.

10. The method of claim 7 wherein the reusable igniter is a butane filled igniter.

11. The method of claim 7 wherein the mobile device is a software-enabled watch.

12. The method of claim 7 wherein the notification system is a geolocation push notification system.

13. The method of claim 8 wherein a second alert system is coupled to the processor.

14. A method comprising:
placing a candle on a disc having:
a disc processor;
a pressure sensor coupled to the disc processor; and
a third short-range wireless device coupled to the disc processor;
the disc processor communicating with a mobile device having:
a second short-range wireless device couplable to the third short-range wireless device; and
a downloadable software application having a notification system and a geolocation restriction setting;
the disc processor sending a first pressure sensor reading to the mobile device;
configuring a pressure reading restriction on the mobile device;
the notification system alerting the mobile device once the pressure reading restriction is exceeded.

15. The method of claim 14 further comprising:
a reusable igniter couplable to the mobile device, the reusable igniter having:
an igniter processor;
a memory storage device coupled to the igniter processor; and
a first short-range wireless device coupled to the igniter processor.

16. The method of claim 15 wherein the reusable igniter is an electric rechargeable igniter.

17. The method of claim 15 wherein the reusable igniter is a butane filled igniter.

18. The method of claim 14 wherein the mobile device is a software-enabled watch.

19. The method of claim 14 wherein the notification system is a geolocation push notification system.

* * * * *